United States Patent Office

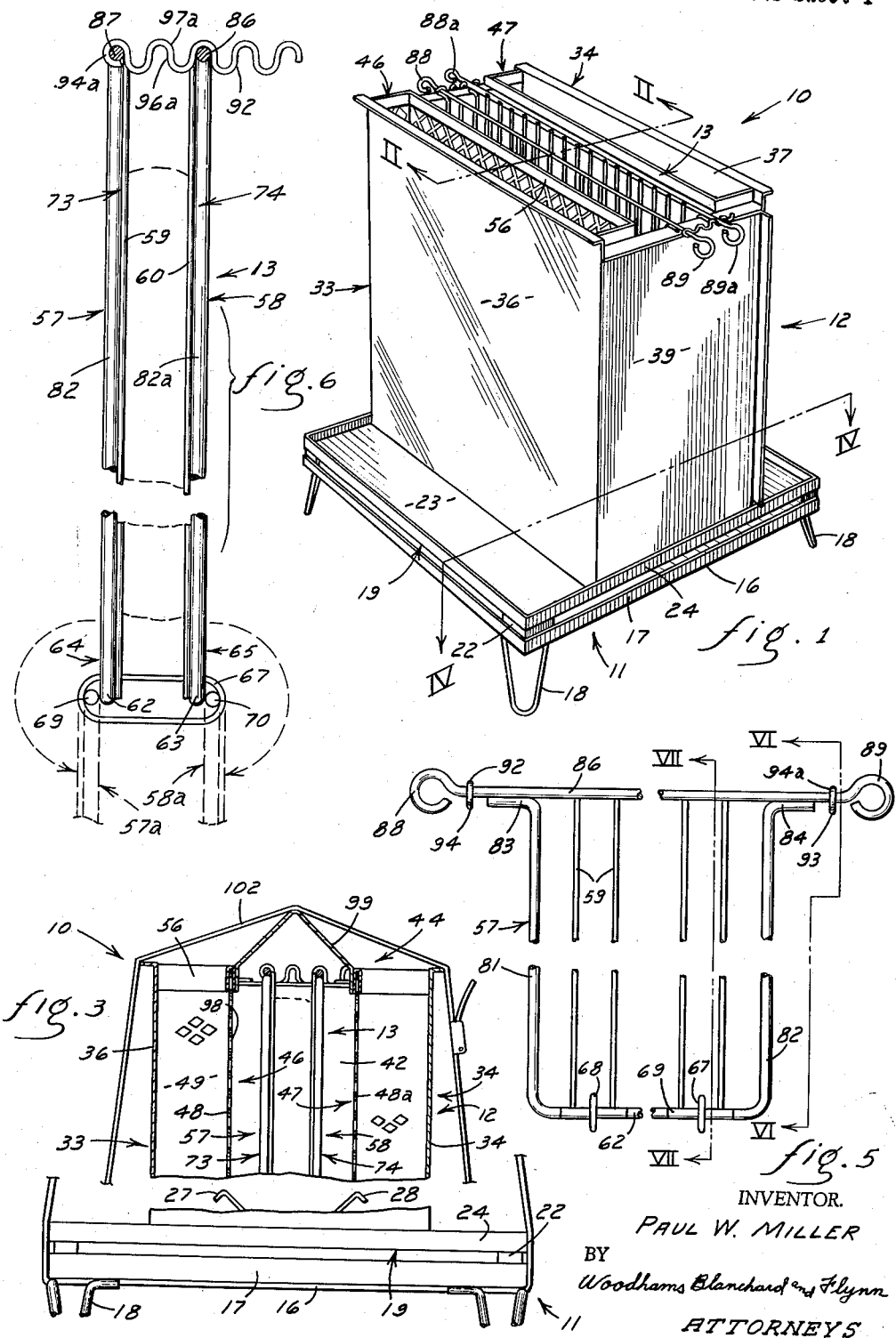

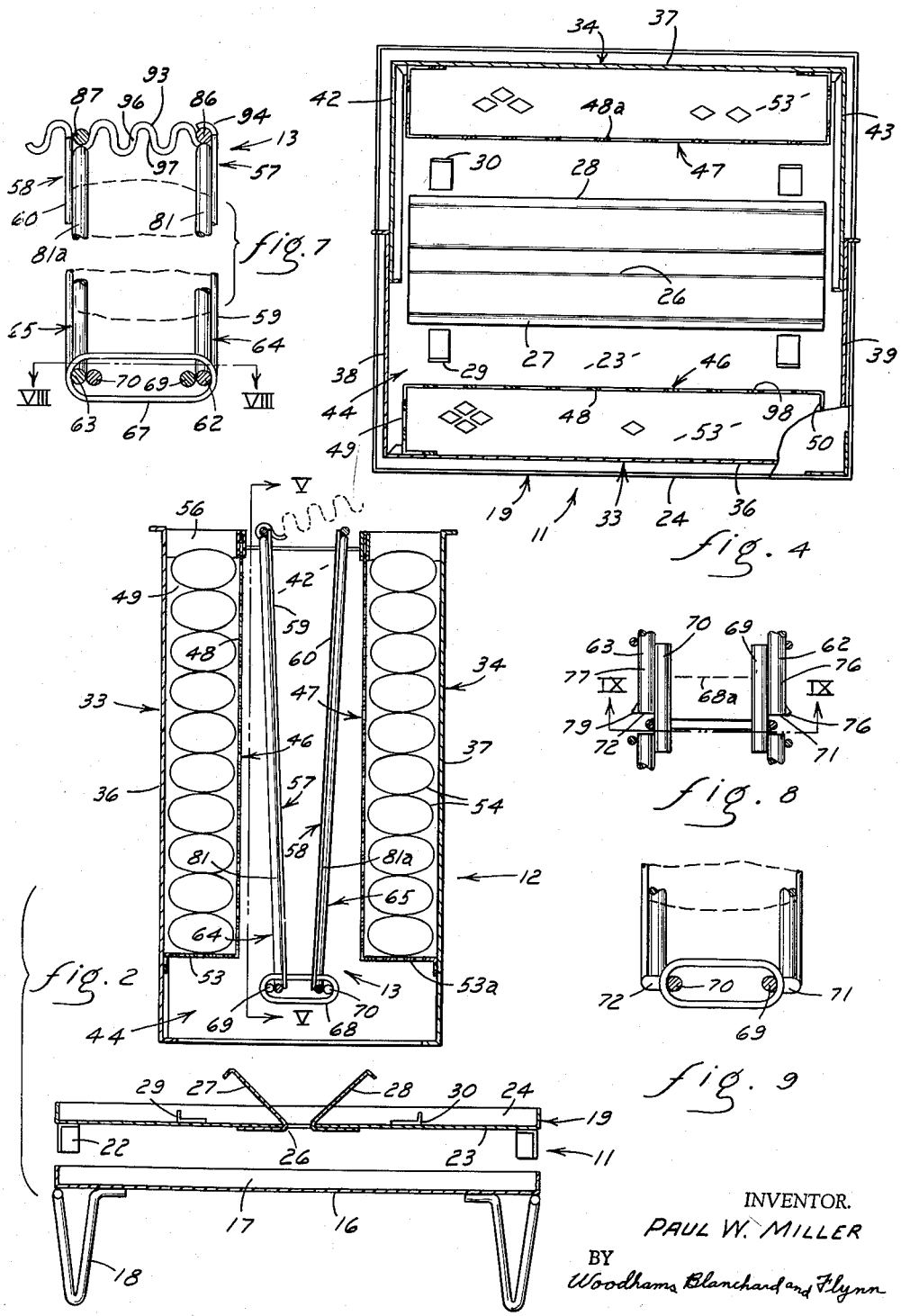

2,975,698
Patented Mar. 21, 1961

2,975,698

TWIN CHARCOAL VERTICAL BROILER

Paul W. Miller, 837 W. South St., Kalamazoo, Mich.

Filed May 14, 1959, Ser. No. 813,165

5 Claims. (Cl. 99—390)

This invention relates in general to an improved, vertical charcoal broiler having a pair of spaced, charcoal containers defining an adjustable broiling compartment therebetween and, more particularly, to a type of charcoal broiler in which the charcoal can be quickly and easily ignited, and which includes structure for collecting separately the ashes of the charcoal and the drippings from the food, thereby avoiding the flash fires, excess smoke and fumes which result when the drippings fall into the hot charcoal or its ashes.

Outdoor cooking, and particularly the broiling of meats by a charcoal fire, has become very popular in recent years. Thus, many types of charcoal broilers have been developed for use by the average person who often is not an expert cook. The pan-type broiler, which is probably the type most widely used by amateur cooks, has a horizontal grill. Thus, the drippings from the meat drop into the charcoal which produces flash fires, excessive smoke and noxious fumes. It is difficult and time consuming to ignite the charcoal in a pan-type broiler unless special igniting fuels are used. However, many people avoid the use of igniting fluids, for example, because they can be dangerous and because they can adversely affect the desired characteristics in a charcoal fire.

Where a pan-type broiler is used, the meat must be seared or broiled on one side at a time, thereby permitting the juices to escape from the other side. Pan-type broilers are often difficult to transport and the charcoal must usually be carried in a separate container to the point of such use. High winds will adversely affect the performance of a pan-type broiler unless it has a hood, which materially increases the cost of the broiler and often interferes with the broiling operation.

Generally speaking, these same difficulties are encountered where a broiling pit or open fireplace is used for this purpose.

In an effort to overcome these problems, attempts have been made to develop a charcoal broiler wherein the meat and the charcoal are held in adjacent vertical arrangements. Insofar as I am aware, existing vertical broilers are complicated in structure and/or in use, are expensive to build and are not designed for use by the amateur cook in his back yard or at the picnic grounds. Moreover, many of these vertical broilers do not avoid all or even most of the problems which are encountered during the use of the pan-type broiler.

Furthermore, most of the existing charcoal broilers, whether pan-type, vertical or otherwise, are not adapted for immediate alternate use in a conventional, residential fireplace, particularly if it is small in size. Such use is often very desirable where the weather becomes unsatisfactory for outdoor cooking and the meal must, therefore, be prepared indoors.

Accordingly, a primary object of this invention has been the provision of an improved vertical broiler designed to avoid or greatly reduce all of the above-mentioned problems, at least some of which are encountered in using any or all of the existing broiler devices with which I am acquainted.

A further object of this invention has been the provision of a vertical broiler, as aforesaid, which can be loaded at home with charcoal and kindling, after which it can then be easily transported and/or carried to the place of its use, such as a remotely located picnic area, and ignited without effort for use within a very short period of time.

A further object of this invention has been the provision of a vertical broiler, as aforesaid, which is pleasing in appearance, extremely simple to operate, relatively easy and inexpensive to manufacture, very simple and sturdy in construction, completely portable and capable of completely satisfactory operation in a strong wind, in inclement weather or in a fireplace inside of a house.

Other objects and purposes of this invention will become apparent to persons familiar with this type of equipment upon reading the following specification and examining the accompanying drawings in which:

Figure 1 is an oblique view of a vertical broiler embodying the invention.

Figure 2 is an exploded, sectional view taken along the line II—II in Figure 1.

Figure 3 is a broken fragment of an end view of said broiler including additional structure.

Figure 4 is a broken sectional view taken along the line IV—IV in Figure 1.

Figure 5 is a broken side elevational view of a grill member as viewed from the cutting line V—V in Figure 2.

Figure 6 is a broken sectional view taken along the line VI—VI in Figure 5.

Figure 7 is a broken sectional view taken along the line VII—VII in Figure 5.

Figure 8 is a sectional view taken along the line VIII—VIII in Figure 7 and showing a modified construction.

Figure 9 is a sectional view taken along a line IX—IX in Figure 8.

For convenience in description, the terms "upper," "lower" and derivatives thereof will have reference to the broiler and parts thereof as appearing in Figures 1, 2 and 3. The terms "inner," "outer" and derivatives thereof will have reference to the geometric center of said broiler and parts thereof.

*General description*

The objects and purposes of the invention, including those set forth above, have been met by providing a vertical charcoal broiler comprised of a base structure removably supporting a heating unit including a pair of vertical charcoal containers having perforated opposing side walls defining a broiling compartment. The base structure is comprised of spaced and separable, upper and lower pans, the lower of which is supported upon ground engaging legs. The upper pan has an elongated opening midway between a pair of opposite edges thereof which is disposed directly below the broiling compartment. The charcoal containers are disposed on opposite sides of the elongated opening and are movable toward and away from each other for varying the intensity of the heat within said compartment.

A food holder, which has a pair of flat, perforated grill members hingedly connected along one corresponding edge of each, has support means secured thereto near the opposite edges of each grill member for supporting same with respect to said containers and within said compartment. The flash fires, excess smoke and fumes which result from burning fat and the like are avoided by causing the hot ashes from the burning charcoal to drop into the upper pan on opposite sides of the opening therein, whereas the drippings from the food within the food holder drop through the opening in the upper pan and are collected in the lower pan.

Detailed construction

The vertical broiler 10 (Figures 1 and 2), which has been selected to illustrate a preferred embodiment of the invention, is comprised of a base structure 11, the heating unit 12 mounted thereon and the food holder 13 supported within the heating unit.

The base structure 11 (Figures 1 and 2) includes a drip pan 16 and support pan 19, both of which are preferably rectangular and substantially flat. The drip pan 16 has a relatively short, upstanding side wall 17 and four supporting legs 18 which are secured, as by welding, to the lower surface of said pan near the corners thereof. The support pan 19, which is preferably of substantially the same size and shape as the drip pan 16, has a bottom wall 23 and an upstanding side wall 24. The support pan 19 is supported upon, and spaced upwardly from, the drip pan 16 by four corner legs 22, which are secured to the bottom wall 23, as by welding, and are removably received, respectively, into the four corners of the drip pan 16.

The bottom wall 23 (Figures 2 and 4) of the support pan 19 has an elongated draft opening 26 (Figures 2 and 4) which is preferably midway between and parallel with the lengthwise edges of said bottom wall 23. A pair of elongated guide flanges 27 and 28 are secured, as by welding, to the bottom wall 23 adjacent to, and along the length of, the opening 26, and extend divergently upwardly from said bottom wall 23. Stop flanges 29 and 30 are secured, as by welding, to the upper surface of the bottom wall 23 on opposite sides of, and spaced from, the guide flanges 27 and 28 for reasons appearing hereinafter.

The heating unit 12 (Figures 1, 2 and 4) is comprised of a pair of substantially identical, channel-shaped, charcoal supporting members 33 and 34 (Figure 4) having webs 36 and 37, respectively, and the end flanges 38 and 39 and 42 and 43, respectively. The said webs and flanges, as well as the drip pan 16 and support pan 19, are preferably fabricated from heat resistant sheet material, such as sheet metal. The channel members 33 and 34 are preferably arranged so that the flanges of one may be slidably received between the flanges of the other. The flanges 38, 39, 42 and 43 are preferably of such length that they are always in an overlapped condition, even when the webs 36 and 37 are against the opposite sides of the side wall 24 and, therefore, at their maximum distance from each other. Accordingly, said webs and flanges cooperate with the base structure 11 to define a substantially rectangular heating zone 44, which is open at its upper end and communicates at its lower end with the draft opening 26 in the bottom wall 23 of the support pan 19.

A pair of charcoal baskets or retainers 46 and 47 (Figures 2 and 4) are supported upon the opposing surfaces of the webs 36 and 37, respectively. The basket 46, for example (Figure 4), is comprised of a flat, rectangular side wall 48, a pair of end walls 49 and 50 and a bottom wall 53, all of which may be formed from a single sheet of perforate material, such as expanded metal. The free edges of the end walls 49 and 50 and the bottom wall 53 are secured, as by welding, to the inner surface of the web 36 so that the side wall 48 is substantially parallel with said web 36 and spaced therefrom a distance preferably approximately equal to the width of a charcoal briquet 54. A protective edge element 56 may be attached, if desired, to the upper edges of the side wall 48 and end walls 49 and 50.

The basket 47 (Figure 4) may be, and preferably is, substantially identical in structure with the basket 46 and is secured in a similar manner upon the web 37. Accordingly, reference numerals applied to the individual parts of the basket 46 will also be applied with the suffix "*a*" to the corresponding parts of the basket 47. As shown in Figures 1 and 2, the upper edges of the baskets 46 and 47, as well as the webs 36 and 37, are slightly above the upper edges of the flanges 38, 39, 42 and 43, the purpose of which will become apparent hereinafter. It will also be observed that the basket 46 is spaced from the flanges 38 and 39 so that the flanges 42 and 43 can slide therebetween.

It has been found that the heat developed in the heating unit may cause the flanges 38 and 39, and/or the flanges 42 and 43 to flex sidewardly and become divergent. This may cause the said flanges to bind against each other and against the side wall 24 on the support pan. To avoid this problem, the length of the web 37 is decreased slightly and the flanges are arranged so that they converge slightly away from their respective webs when they are cool. Thus, when said flanges become hot they will flex into substantially parallel and non-binding positions.

The food holder 13 (Figures 1, 2, 5 and 6) is comprised of a pair of flat, perforate grill members 57 and 58, which are preferably rectangular and similar in shape and construction, and which may be fabricated from wire elements or sheets of expanded metal. In this particular embodiment, the grill members 57 and 58 each have a plurality of parallel grill elements 59 and 60 which are secured, as by welding, upon the grill frames 64 and 65, respectively. Said grill frames include U-shaped members having bottom frame elements, to which the lower ends of the grill elements 59 and 60 are secured.

The bottom elements 62 and 63 (Figure 6) are both encircled near their opposite ends by a pair of elongated, rigid and fire-resistant loops 67 and 68 (Figure 5). Two pairs of rods or bosses 69 and 70 are secured, respectively, to the bottom elements 62 and 63 at the points where they are encircled by the loops 67 and 68. The bosses are disposed upon the opposite sides of said elements 62 and 63 from the grill elements 59 and 60, and they preferably extend the full distance between the two grill elements on opposite sides of each loop. Accordingly, each of the bosses 69 and 70 are always encircled by one of the loops 67 and 68. The loops 67 and 68 (Figure 5) have inside dimensions such that the bottom edge elements 62 and 63, including the bosses 69 and 70 can be pivoted freely and easily within said loops for the purpose of loading the food holder and changing its size. For example, the grill members 57 and 58 can both be easily rotated, as shown in Figure 6, through angles of about 180° from their solid line positions to their broken line positions 57*a* and 58*a*. The broken line positions 57*a* and 58*a* are the same as the solid line positions 57 and 58 in Figure 7, wherein the distance between the grill elements 59 and 60 is substantially increased.

As shown in Figure 8, the bottom edge elements 62 and 63 may be provided with notches 71 and 72 which extend inwardly toward the bosses 69 and 70 and into which the ends of the loop 68, for example (Figures 8 and 9) may be received. Similar notches, not shown, are provided in the portions of the edge elements 62 and 63 encircled by the loop 67 (Figure 5). The notches 71 and 72 are preferably positioned adjacent to one of the vertical grill elements 73 and 74 of the grills 57 and 58, respectively. Thus, the ends of said loop 68 can be disposed either within the notches 71 and 72 or in engagement with the external surfaces of the adjacent portions 76 and 77 of the bottom edge elements 62 and 63, as desired. When the loop 68 is within the notches 71 and 72, the grill elements 59 and 60 are spaced from each other a distance increased by the combined depths of the notches. The portions 76 and 77 of the bottom elements 62 and 63 are provided with sidewardly extending projections 78 and 79 (Figure 8) adjacent to the notches 71 and 72 to prevent accidental movement of the loop 68 from its broken line position 68*a* (Figure 8) into its solid line position in the notches 71 and 72.

In this particular embodiment, the grill frames 64 and 65 have upwardly extending side elements, such as the side elements 81 and 82 (Figure 5) associated with the grill 59. The upper end portions 83 and 84 of the side elements 81 and 82 are bent sidewardly away from each other adjacent to the upper edges of the grill elements 59. A hanger bar 86 is secured, as by welding, upon the upper edges of the end portions 83 and 84 so that it extends beyond said end portions and is substantially parallel with the bottom edge element 62. The upper ends of the grill elements 59 are secured, as by welding, to hangar bar 86, which constitutes a part of the grill frame 64. The grill 58, which is substantially identical to the grill 57, has a hanger bar 87 at its upper end which extends substantially beyond the upper ends of the side elements 81a and 82a. The outer ends of the hanger bar 86, for example, are provided with integral rings 88 and 89, and the hanger bar 87 has similar rings 88a and 89a.

A pair of latch members 92 and 93 (Figures 6 and 7, respectively) are pivotally supported near one end of each upon the opposite ends of the hanger bar 86, in this particular embodiment, between the rings 88 and 89 and the adjacent upper end portions 83 and 84 respectively. The two latch members are preferably identical so that a detailed description of one will also apply to the other. Referring to the latch member 92, for example (Figures 6 and 7), it may be formed from an elongated element or rod having an integral ring 94 at one end which encircles the hanger bar 86 and rotatably supports the latch member 92 thereon. The elongated rod of the latch member 92 is then bent first in one direction and then in the opposite direction through angles of approximately 180 degrees to provide alternating and sidewardly opening recesses 96 and 97, which are uniformly disposed lengthwise of the latch member 92. Said latch member 92 preferably lies substantially within a single plane and the recesses 96 and 97 are about equal in width to the diameter of the hanger bar 87 which is removably receivable into said recesses. The alternate arrangement of the recesses 96 and 97 provides for a maximum of adjustability in the spacing of the hanger bars 86 and 87 when they are interconnected by the latch members 92 and 93.

The latch member 93 is preferably substantially identical to the latch member 92 and, therefore, has a ring 94a, and alternating recesses 96a and 97a. Under some circumstances, it may be desirable to support one or the other of the latch members 92 and 93 upon the hanger bar 87 whereby its removable engagement is with the hanger bar 86.

As shown in Figure 3, the broiling compartment 98 between the baskets 46 and 47 may be provided with an elongated cover 99 which has an inverted V-shaped cross section and extends between, and is supported at its opposite ends upon, the end flanges 38, 39, 42 and 43.

The entire broiling unit 10, including the cover 99, the heating unit 12 and the base structure 11, may be encircled, as shown in Figure 3, by a removable strap 102 which holds all of the parts of the broiler in a compact portable arrangement which can be quickly and easily lifted and carried by grasping the strap 102.

Operation

The baskets 46 and 47 may be loaded with charcoal, such as charcoal briquets 54 (Figure 2), in advance of the intended use of the broiler 10. Such loading is best accomplished with the cover 99 in position, thereby diverting the charcoal away from the broiling compartment and into said baskets. The cover 99 is removed from the broiler and the food holder 13 is lifted out of the broiling compartment 98. Kindling, such as a handful of wooden sticks and some paper, may be placed in the broiling compartment 98 and the broiler 10 is now ready for immediate use. However, if such use is not desired, the food holder 13 may also be inserted into the broiling compartment 98. The cover 99 and the strap 102, as shown in Figure 3, are mounted upon the broiler 10, which is then ready for transportation to a place of intended use.

Specific reference has been made herein to the use of kindling because the broiler 10 has been especially designed to facilitate its use. As stated above, many people prefer to use kindling in igniting the charcoal and this has been difficult at best with existing vertical broilers. However, it will be clearly understood that igniting fuels, such as highly inflammable liquids or solids, may be used to treat the charcoal briquets 4, so that they can be ignited directly. Moreover, it will also be seen that the baskets 46 and 47 can be filled with ordinary chunks of charcoal, if desired.

If desired, the small amount of kindling required to ignite the charcoal can be carried to the site of its use in any convenient means, such as a paper bag, in order to permit the prior loading of the food holder 13 with the food to be broiled, after which the loaded food holder 13 may then be placed in the broiling compartment 98. If, as is the usual case, the food holder 13 contains perishable meat, the vertical broiler 10 can be quickly converted into a temporary cooling cabinet by placing Dry Ice within the broiling compartment adjacent to and on both sides of the food holder 13. In such case, the charcoal filled baskets 46 and 47, the overlapped flanges 38, 39, 42 and 43, the superimposed drip pan 16 and support pan 19 and the cover 99 will effectively convert the broiling compartment 98 into an effective cooling compartment. When it becomes desirable to use the broiler 10, the strap 102 is removed, and the Dry Ice and the food holder 13 are removed from the broiling compartment 98 and replaced by the above-mentioned kindling, which is ignited in any convenient manner. Ambient air passes between the drip pan 16 and the support pan 19 as a result of the draft produced within the broiling compartment 98 by the ignited kindling. The heat produced by said kindling quickly ignites the surfaces of the charcoal disposed within the baskets 46 and 47 adjacent to the side walls 48 and 48a thereof. Under normal circumstances, the said surfaces are properly ignited and said charcoal is ready for use within a matter of 15 or 20 minutes. By this time the kindling disposed within the broiling compartment 98 has been completely consumed and the ashes thereof have dropped harmlessly through the draft opening 26 into the drip pan 16. If desired, these ashes can be removed from the drip pan 16 by lifting the support pan 19 away from the drip pan 16 which is then emptied and returned to its original position. The food holder 13 is now placed within the broiling compartment 98, preferably with the baskets 46 and 47 at their closest positions. Accordingly, the very intense heat radiated from the burning charcoal and retained within the broiling compartment will quickly and effectively sear and seal all of the surfaces of the food, such as meat, within the food holder 13. As soon as the initial searing is accomplished, the channel members 33 and 34 can be moved away from each other so that a less intense broiling heat is provided, which is continued until the food is broiled to the requirements of the person using the broiler.

Any drippings from the meat within the food holder 13 will move either directly or by way of the guide flanges 27 and 28 through the draft opening 26, whereby they reach the drip pan 16. However, the ashes from the charcoal in the baskets 46 and 47 will drop into the support pan 19, thereby being separated from said drippings. The incoming air which passes between the pans 16 and 19 automatically cools the drippings in the drip pan 16 and, at the same time, forces the heat upwardly away from the draft opening 26. Accordingly, the broiler operates without smudge, smoke, flash fires, fumes or the other undesirable results of having the drippings overheated or burned during the broiling operation. Because the broiling compartment 98 is completely surrounded, except on its upper side, even strong winds will not materially diminish the performance of the broiler 10.

If the meat is fairly thick, the food holder 13 is arranged, as appearing in Figure 7, with the bosses 69 and 70 on the adjacent sides of the grill members, whereby the grill elements 59 and 60 are on the remote, outer sides. If the cut of meat is thinner, the Figure 6 arrangement is best. The latch members 92 and 93 provide for small increments of adjustment intermediate these two positions. By employing the alternate construction shown in Figures 8 and 9, a similar food holder can be utilized to hold very thick cuts of meat, such as chicken.

After use of the broiler has been completed, the charcoal is easily and quickly discharged from the baskets 46 and 47, simply by inverting the channel members 33 and 34. The drip pan 16 and support pan 19 can then be washed like any cooking pan in any conventional manner. Thereafter, the broiler 10 is immediately ready for re-loading and further use in substantially the same manner as set forth above.

Although particular preferred embodiments of the invention have been disclosed above for illustrative purposes, it will be understood that variations or modifications of such disclosure, which lie within the scope of the appended claims, are fully contemplated.

What is claimed is:

1. A vertical charcoal broiler, comprising: a substantially flat drip pan having side wall means therearound; a flat support pan removably supported upon and spaced upwardly from said drip pan, said support pan having an elongated opening substantially parallel with and midway between a pair of opposite edges thereof; a pair of channel shaped members movably supported upon said support pan, said channel members having substantially parallel webs disposed upon opposite sides of said elongated opening and each channel member having a pair of substantially parallel flanges in overlapping arrangement with the corresponding flanges on the other channel member at opposite ends of said opening; a pair of elongated, substantially parallel and upwardly opening charcoal containers of substantially rectangular shape and means supporting said containers upon said channel members on opposite sides of and substantially parallel with said opening, said containers having perforated adjacent and bottom walls, said perforate adjacent walls and said flanges defining a cooking compartment above the opening in said support pan, said channel members being movable toward and away from each other; a pair of flat rectangular grills movably connected along one corresponding edge of each; and support means secured to each grill near the opposite edges of each and engageable with said flanges for supporting said grills within said compartment.

2. The structure of claim 1 wherein said support pan has a bottom wall, an upstanding side wall along the periphery of the bottom wall and a pair of upwardly diverging flanges secured to said bottom wall adjacent to said opening, whereby materials falling from within said compartment are directed into said opening; and wherein said drip pan is supported upon a plurality of legs.

3. The structure of claim 1 wherein the perforate walls of said charcoal containers are spaced from the opposite walls thereof a distance slightly greater than the average width of a charcoal briquet, whereby all briquets placed within said containers may have a surface thereof adjacent to the perforate wall of the container.

4. A vertical broiler for use with charcoal briquets, comprising: a flat rectangular base pan supported upon corner legs and having an upstanding side wall; a flat, rectangular support pan having corner legs supported upon said base pan within the corners thereof, said support pan being spaced upwardly from said base pan and having an elongated opening therethrough midway between and parallel with the lengthwise edges thereof; a pair of upwardly diverging drain flanges secured to said support pan adjacent to and parallel with the opposite edges of said elongated opening; a pair of channel-shaped members movably supported upon said support pan, said channel members having substantially parallel webs disposed upon opposite sides of said elongated opening and each channel member having a pair of substantially parallel flanges in overlapping arrangement with the corresponding flanges on the other member at opposite ends of said opening; a pair of perforate charcoal retainers each having a relatively flat sidewall, a pair of end walls and a bottom wall, the free edges of said end walls and bottom wall being secured to the opposing sides of said webs to define charcoal containers; a pair of stop members on said support pan limiting movement of said channel members toward each other whereby a cooking compartment is defined between said charcoal retainers and said flanges above said elongated opening; and a food-supporting grill including a pair of rectangular perforate members hingedly connected together along one corresponding edge of each and having support means near the opposite edge of each engageable with said flanges for removably supporting said food grill within said compartment.

5. A vertical charcoal broiler, comprising: a substantially flat base pan having support structure and an upstanding side wall; a substantially flat support pan removably mounted upon said base pan, said support pan being spaced upwardly from said base pan and having an elongated central opening therethrough, whereby ambient air can pass between said base pan and said support pan and through said elongated opening; drain flanges secured to said support pan and extending upwardly therefrom on opposite sides of and along said elongated opening; a pair of channel-shaped members movably supported upon said support pan, said channel members having substantially parallel webs disposed upon opposite sides of said drain flanges and each channel member having a pair of substantially parallel side flanges in overlapping arrangement with the corresponding side flanges on the other channel member at opposite ends of said opening; a pair of elongated charcoal retainers supported upon said channel members between the side flanges thereof, said retainers having end walls, bottom walls and adjacent, perforate side walls, and said channel members being movable toward and away from each other, whereby a cooking compartment of variable size is defined between said perforate side walls and said side flanges above said drain flanges; and a food supporting grill including a pair of flat perforate members connected together along corresponding edges of each and having support means thereon engageable with said flanges for removably supporting said food grill within said compartment.

References Cited in the file of this patent

UNITED STATES PATENTS

| | | |
|---|---|---|
| 244,060 | Johnson et al. | July 12, 1881 |
| 1,398,157 | Segar | Nov. 22, 1921 |
| 1,656,181 | Elbert | Jan. 17, 1928 |
| 1,713,303 | Serrell | May 14, 1929 |
| 1,783,183 | Fisher | Dec. 2, 1930 |
| 2,168,390 | Bernis | Aug. 8, 1939 |
| 2,314,772 | Corra | Mar. 23, 1943 |
| 2,335,772 | Tate | Nov. 23, 1943 |
| 2,441,190 | Fuller | May 11, 1948 |
| 2,433,080 | Alexander | Dec. 5, 1950 |
| 2,681,001 | Smith | June 15, 1954 |
| 2,865,282 | Brown et al. | Dec. 23, 1958 |